(No Model.)

W. TAYLOR.
NAIL OR SPIKE.

No. 423,535. Patented Mar. 18, 1890.

Witnesses:
Josiah W. Ells
Jas. C. Williams

Inventor.
William Taylor

UNITED STATES PATENT OFFICE.

WILLIAM TAYLOR, OF ALLEGHENY, PENNSYLVANIA.

NAIL OR SPIKE.

SPECIFICATION forming part of Letters Patent No. 423,535, dated March 18, 1890.

Application filed April 19, 1888. Serial No. 271,248. (No model.)

*To all whom it may concern:*

Be it known that I, WILLIAM TAYLOR, a citizen of the United States, residing at Allegheny, in the county of Allegheny and State of Pennsylvania, have invented a new and Improved Nail or Spike, of which the following is a specification.

My invention relates to that class of nails or spikes having a triangular shank or body, and the improvement I have made consists in producing a nail or spike with a three-cornered or triangular head, curved and spreading shoulders underneath said head, and an angular pyramidal point.

The improvement I have made will be readily understood from the following description, taken in connection with the accompanying drawings, wherein—

Figure 1:
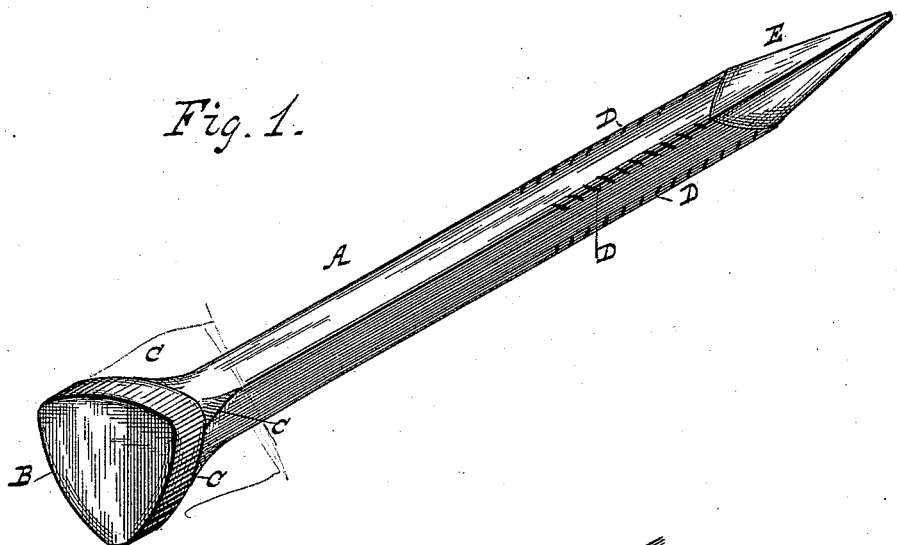
Figure 2:
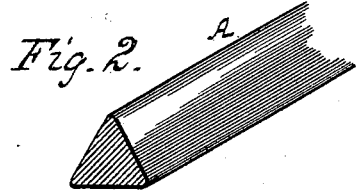
Figure 3:
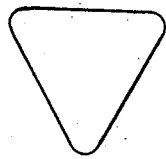

Figure 1 represents a perspective view of my improved nail or spike; Fig. 2, a transverse section of the shank or body of said nail; Fig. 3, a diagram representing the outlines of a nail-head the edges of which are bounded by three straight lines joined together by a short curved line at each corner.

The shank or body A of this nail or spike in its general form is triangular in cross-section, which triangularity may be varied as to the width of its three sides. They may be all of equal width and meet each other with a sharp edge or in such a manner as to form a blunt edge. On one end of the shank A is a head B of suitable breadth and thickness, having in lateral extension a form corresponding to that of a curvilinear triangle having rounded corners, being the best shape for nails having a triangular shank or body and the easiest made, as the metal naturally takes that form in the heading process unless prevented by an expensive construction of dies. Beneath the head B the body or shank A is gradually swelled or enlarged into the head, forming shoulders C, that greatly strengthen the nail at that part. The edges of the triangular shank A are provided with a series of small nicks or notches D, which may extend along other portions of the shank any required distance.

This nail or spike is provided with a pyramidal point E, whose base is a polygon with plain triangular sides, their several points meeting in one at the apex.

Although I have shown and described my improved nail or spike as being provided with a head whose lateral projection presents a curvilinear triangle having rounded corners, I wish it distinctly understood that I do not limit myself to that exact form, as my invention includes any triangular or three-cornered head corresponding generally to the triangularity of its body or shank, and that whether one or both be formed on straight or curved lines.

What I claim as my invention is—

1. As a new article of manufacture, a nail or spike constructed with a three-cornered shank or body and a three-cornered head.

2. A nail or spike constructed with a triangular shank or body provided with a triangular head having rounded corners.

3. A nail or spike constructed with a triangular shank or body, a triangular head, and curved shoulders underneath the head.

4. A nail or spike constructed with a triangular shank or body, a triangular head, and a pyramidal point whose base is a polygon with plain triangular sides, their several points meeting at the apex to form a single point.

WILLIAM TAYLOR.

Witnesses:
JOSIAH W. ELLS,
JAS. C. WILLIAMS.